United States Patent
Kim

(10) Patent No.: US 12,177,880 B2
(45) Date of Patent: Dec. 24, 2024

(54) METHOD AND ACCESS NETWORK NODE FOR SCHEDULING TRANSMISSION FOR TERMINAL DEVICE

(71) Applicant: Telefonaktiebolaget LM Ericsson (publ), Stockholm (SE)

(72) Inventor: Byounghun Kim, Seoul (KR)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 457 days.

(21) Appl. No.: 17/769,900

(22) PCT Filed: Nov. 6, 2019

(86) PCT No.: PCT/KR2019/014998
§ 371 (c)(1),
(2) Date: Apr. 18, 2022

(87) PCT Pub. No.: WO2021/090980
PCT Pub. Date: May 14, 2021

(65) Prior Publication Data
US 2022/0369326 A1 Nov. 17, 2022

(51) Int. Cl.
*H04W 72/542* (2023.01)

(52) U.S. Cl.
CPC .................. *H04W 72/542* (2023.01)

(58) Field of Classification Search
CPC .......... H04W 72/542; H04W 36/0088; H04W 72/1273
See application file for complete search history.

(56) References Cited

U.S. PATENT DOCUMENTS

| 2010/0008348 A1 | 1/2010 | Zhang et al. |
| 2017/0026863 A1* | 1/2017 | Wang ............... H04W 4/70 |

(Continued)

FOREIGN PATENT DOCUMENTS

| CN | 106559826 A | 4/2017 |
| CN | 109391408 A | 2/2019 |

(Continued)

OTHER PUBLICATIONS

Office Action mailed Jul. 29, 2024 for Chinese Patent Application No. 201980102076.6, 6 pages.
Wi Rapporteur (Ericsson); "RAN1 agreements for Rel-13 eMTC sorted and edited by topic"; R1-156376; 3GPP TSG RAN WG1 Meeting #82bis; Oct. 5-9, 2015, 22 pages.
ETSI MCC; "RAN4#86-Bis Meeting Report"; R4-1806101; 3GPP TSG-RAN WG4 Meeting #87; May 20, 2018; 851 pages.

(Continued)

*Primary Examiner* — The Hy Nguyen
*Assistant Examiner* — Jesse P. Samluk
(74) *Attorney, Agent, or Firm* — Sage Patent Group

(57) ABSTRACT

A method and an access network node are disclosed for scheduling transmission for terminal device. According to an embodiment, the access network node determines, for a transmission to be scheduled for a terminal device, whether one or more control channels required by the transmission have no collision with measurement gap and a traffic channel required by the transmission has collision with a measurement gap, based on current repetition number of the traffic channel. When determining that the one or more control channels have no collision with measurement gap and the traffic channel has collision with a measurement gap, the access network node determines a second repetition number of the traffic channel that is larger than the current repetition number of the traffic channel. The access network node schedules the transmission for the terminal device based on the second repetition number.

20 Claims, 19 Drawing Sheets

(56) References Cited

U.S. PATENT DOCUMENTS

| | | |
|---|---|---|
| 2018/0324619 A1 | 11/2018 | Harada et al. |
| 2019/0174341 A1 | 6/2019 | Chincholi et al. |
| 2019/0239106 A1 | 8/2019 | Cui et al. |

FOREIGN PATENT DOCUMENTS

| | | | |
|---|---|---|---|
| CN | 109845172 A | 6/2019 | |
| CN | 109845305 A | 6/2019 | |
| EP | 1406406 A1 | 4/2004 | |
| EP | 2161864 A1 * | 3/2010 | ........... H04L 1/0038 |
| WO | WO-2018175521 A1 * | 9/2018 | ............. H04L 5/001 |

OTHER PUBLICATIONS

International Search Report and Written Opinion of the International Searching Authority for PCT International Application No. PCT/KR2019/014998 dated Jul. 30, 2020.

Huawei et al., "UE UL transmission after MG (section 9.1.2)," R4-1815162, 3GPP TSW-WG4 Meeting #89, Spokane, US, Nov. 12-16, 2018, 10 pages.

Extended European Search Report for European Patent Application No. 19952130.3 dated Jun. 14, 2023, 22 pages.

Ericsson, "NB-IoT—Collision handling," R1-161838, 3GPP TSG-RAN1—Ad Hoc NB-IoT, Mar. 22-24, 2016, Sophia Antipolis, France, 2 pages.

* cited by examiner

[Figure 1]
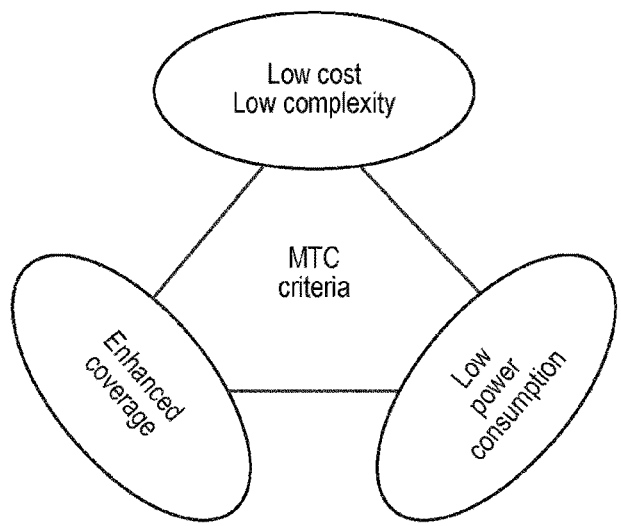
[Figure 2]
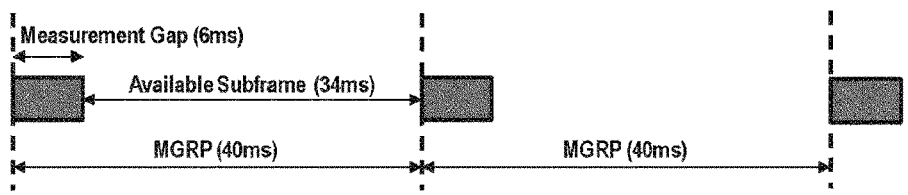
[Figure 3]
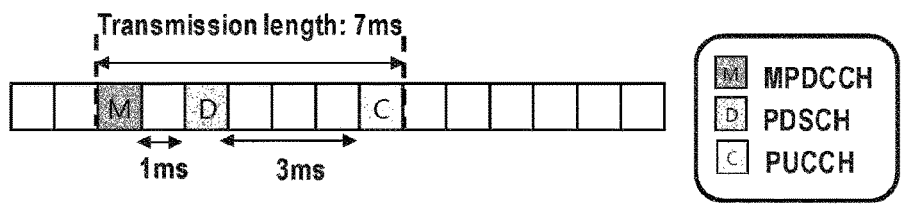
[Figure 4]
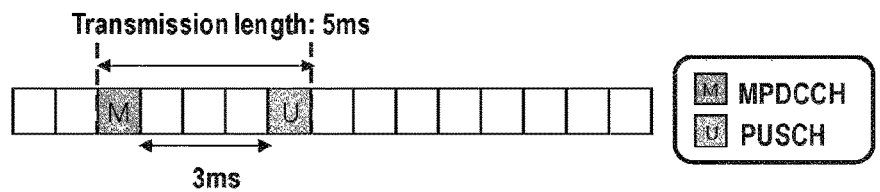

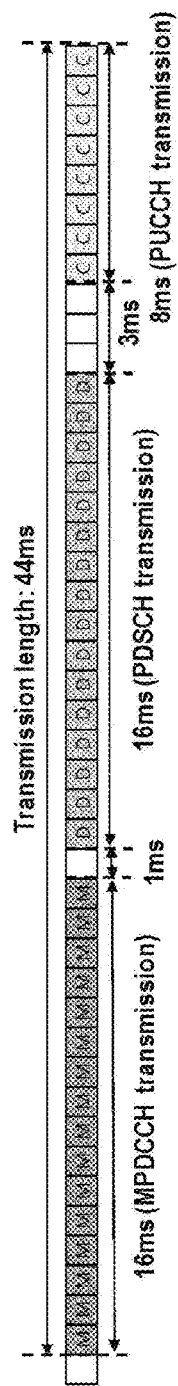
[Figure 5]

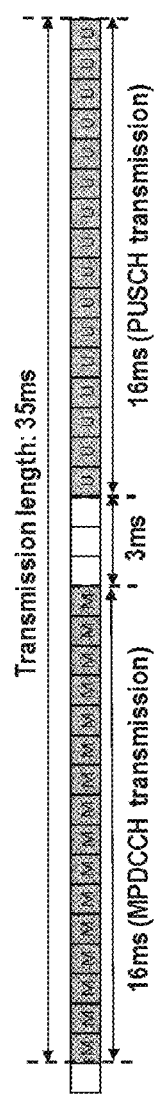
[Figure 6]

[Figure 9]
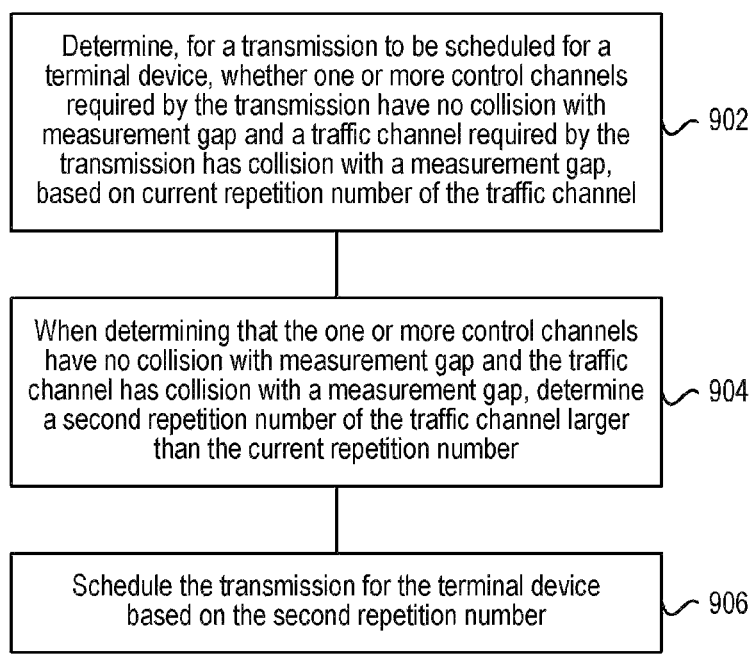
[Figure 10]
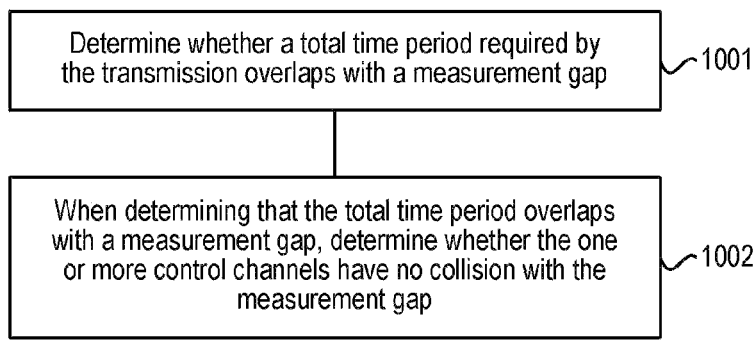

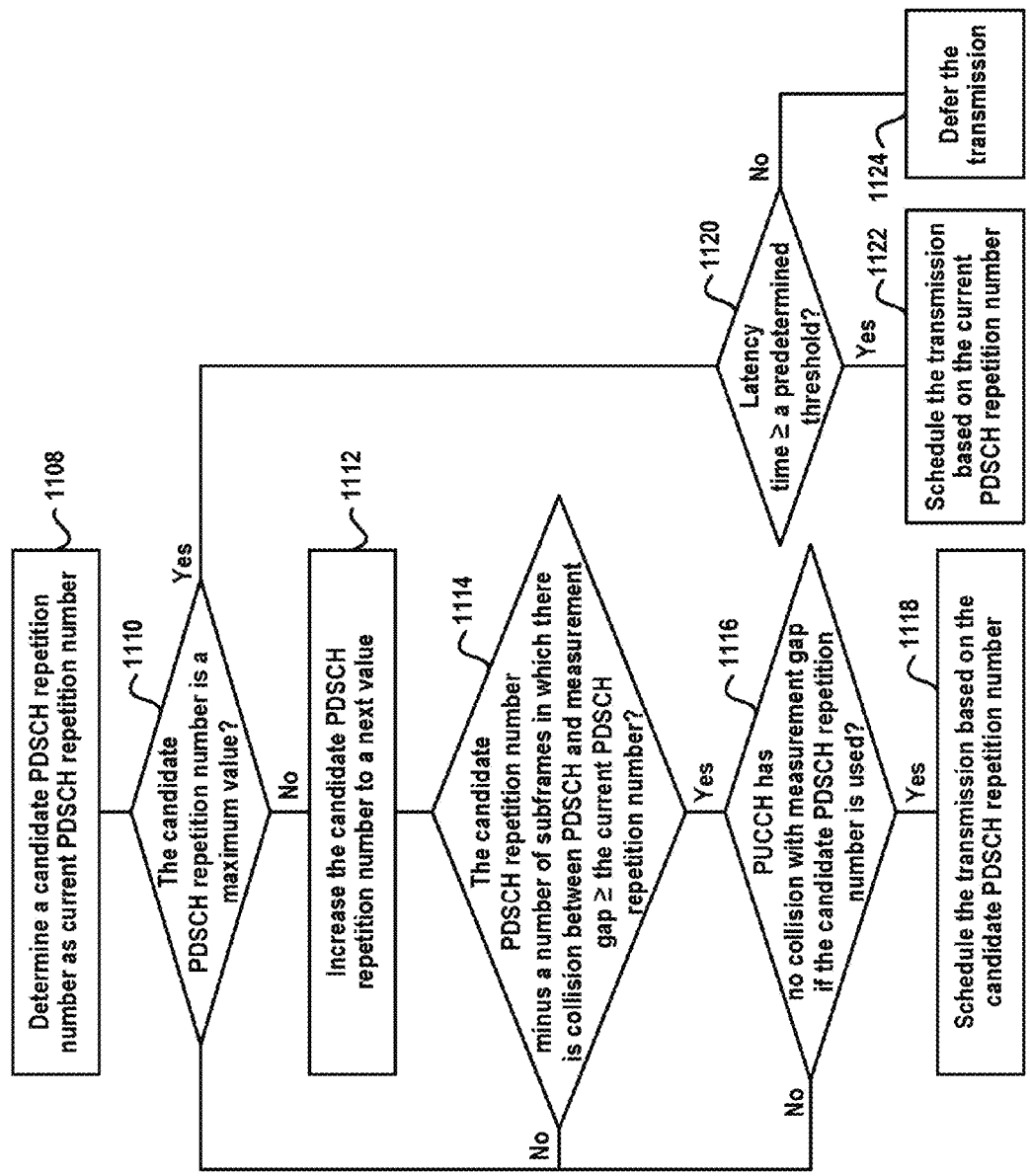
[Figure 11]

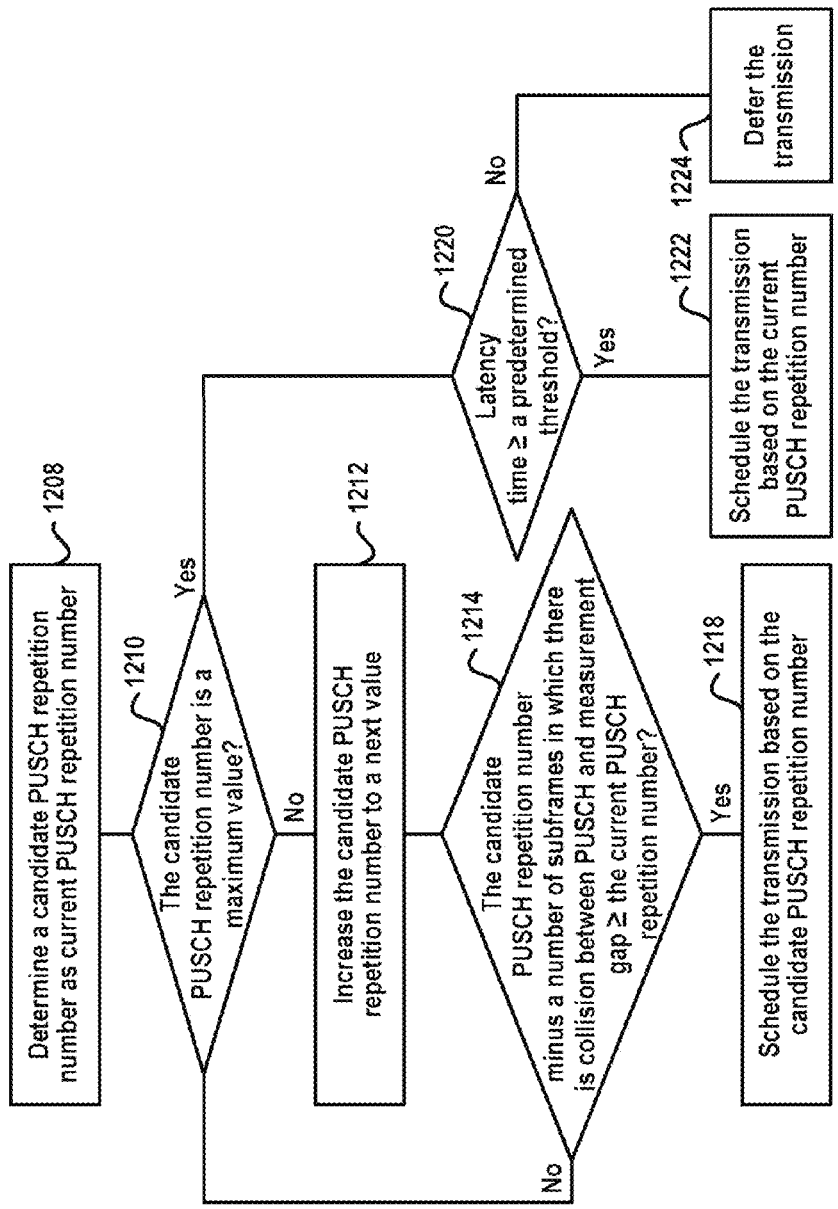
[Figure 12]

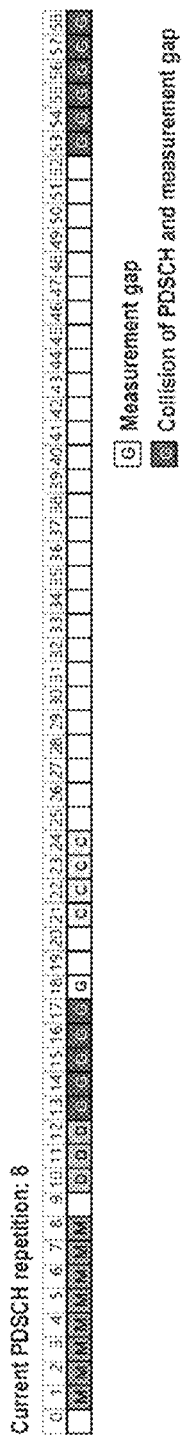
[Figure 13A]

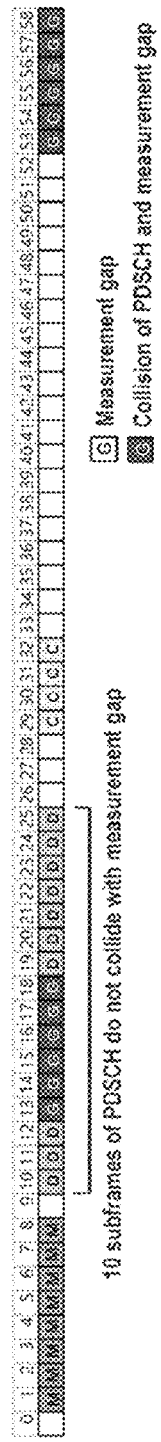
[Figure 13B]

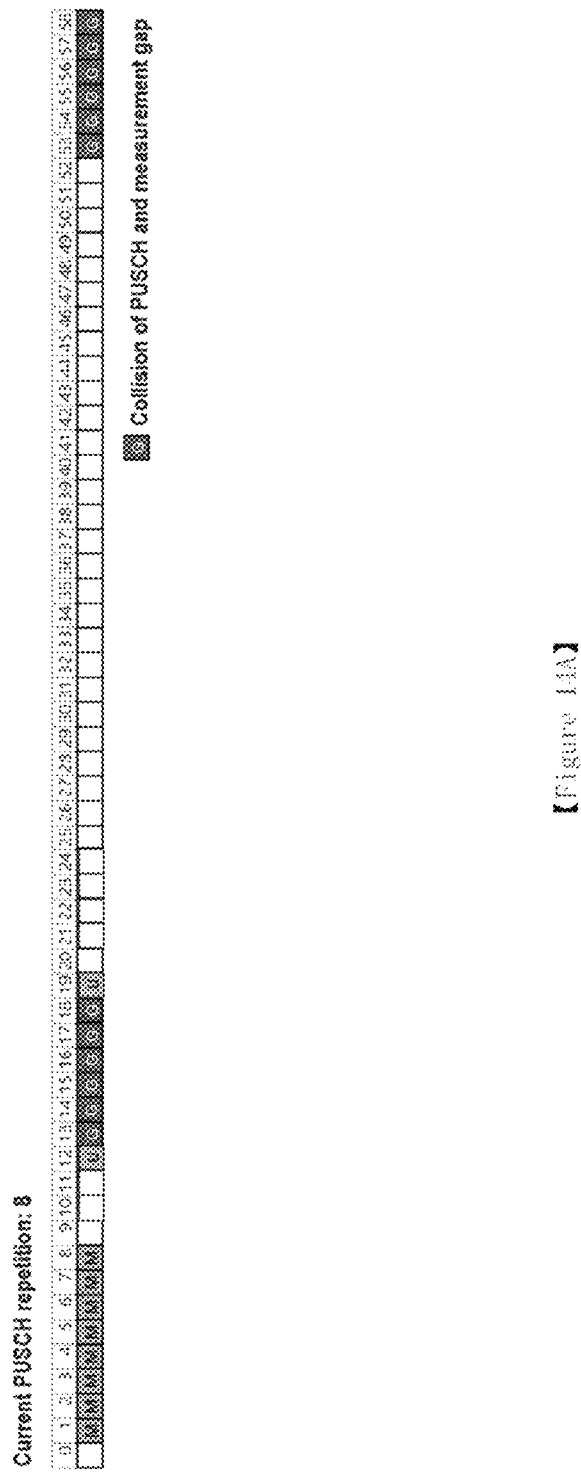
[Figure 11A]

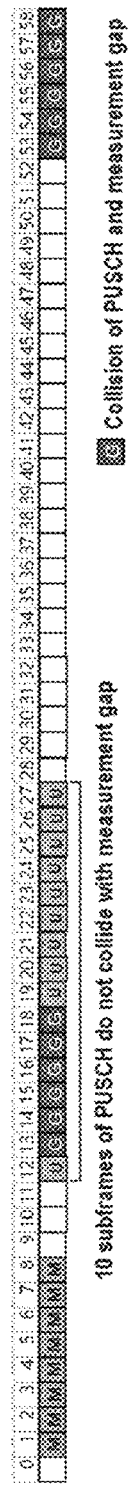
[Figure 11B]

【Figure 15】
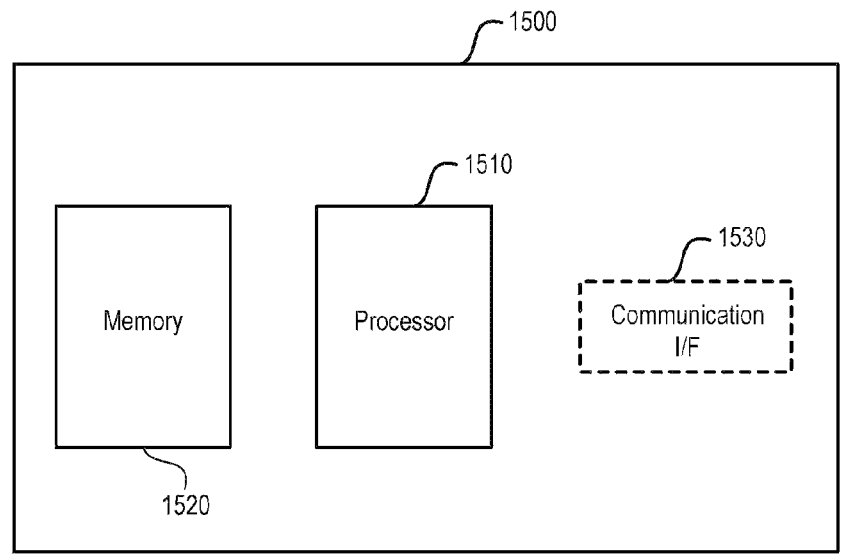
【Figure 16】
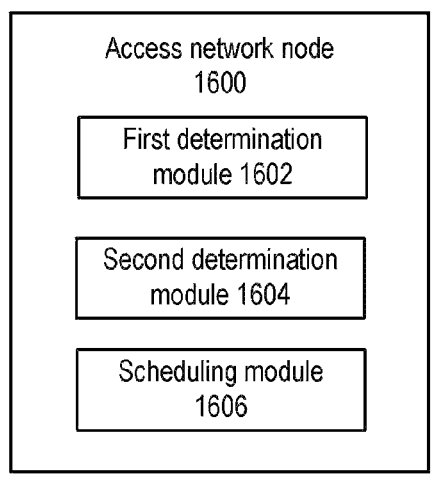

[Figure 17]
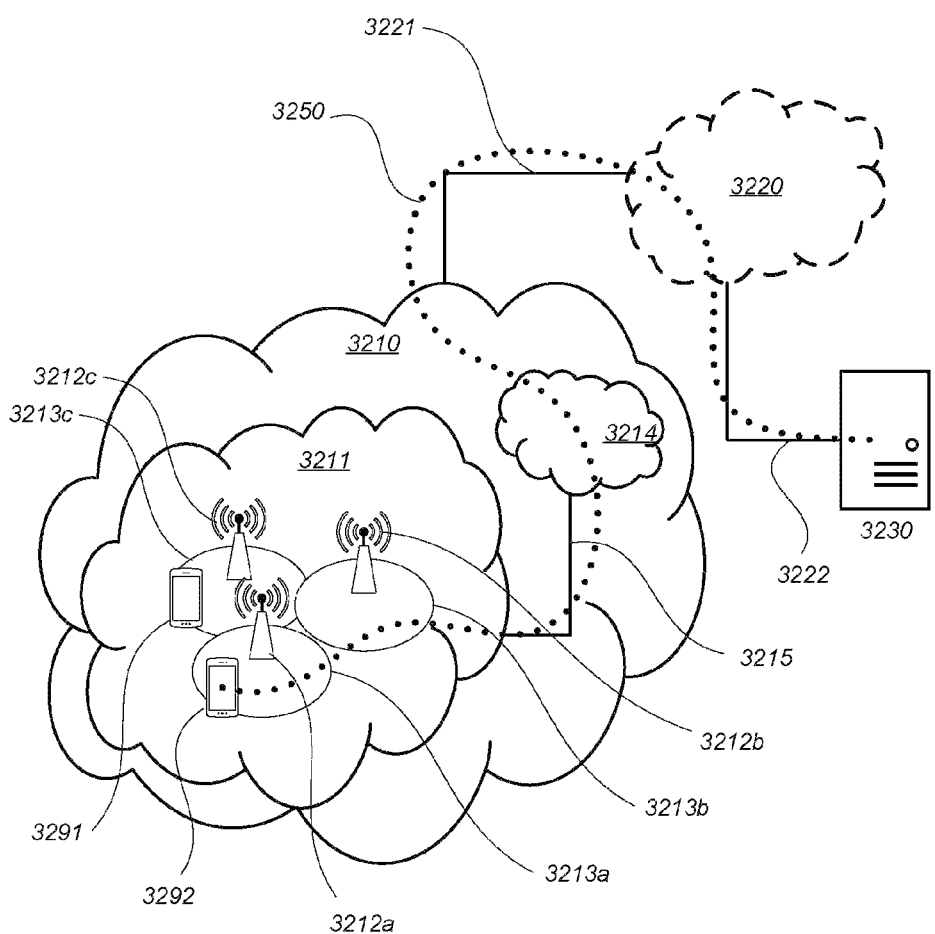

[Figure 18]
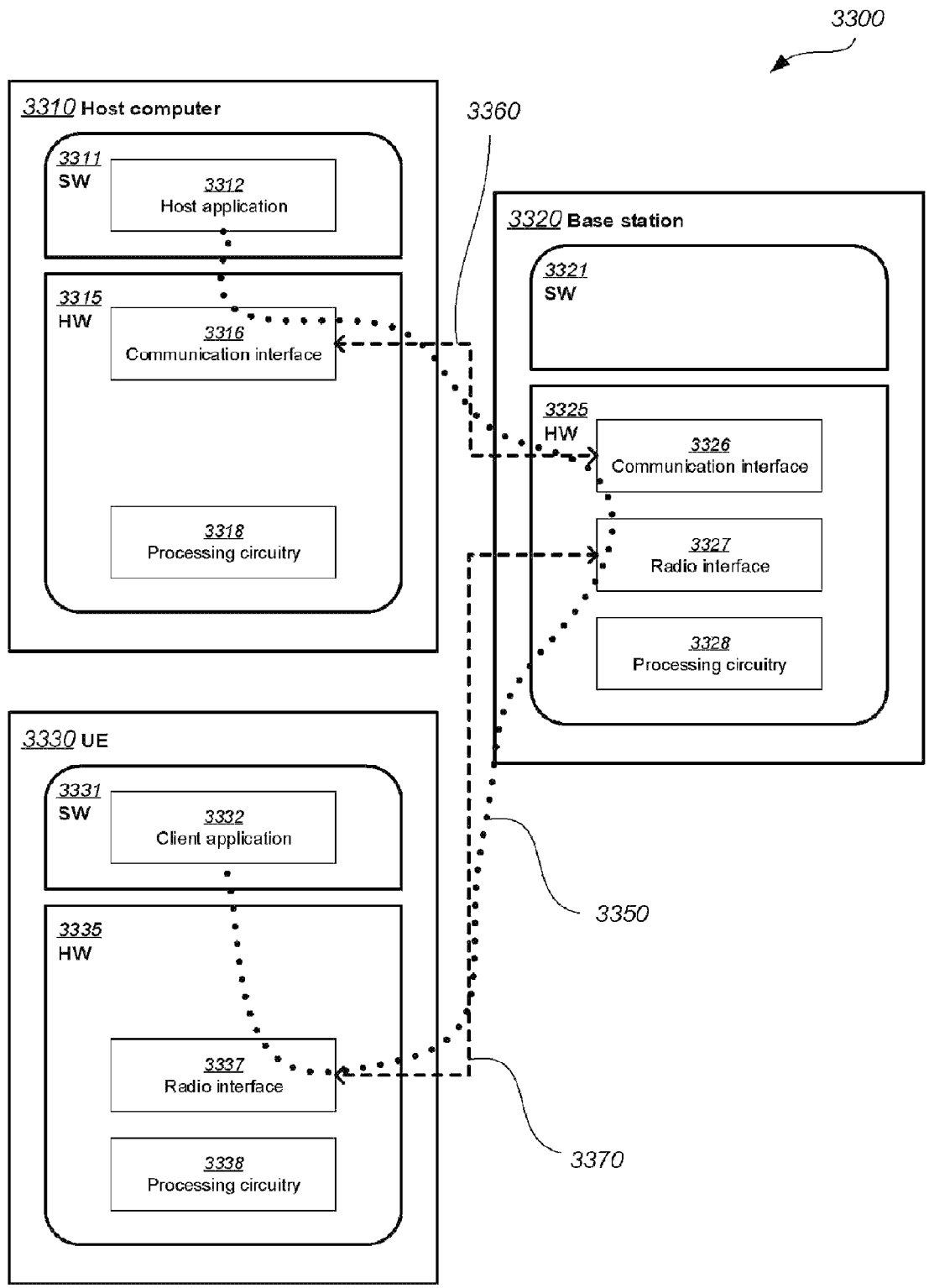

[Figure 19]
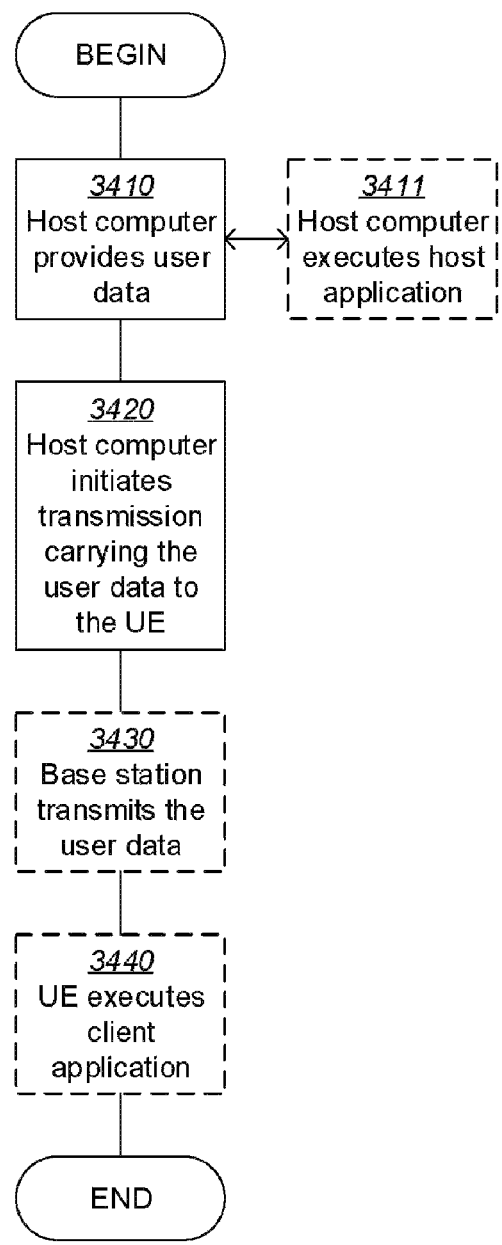

[Figure 20]
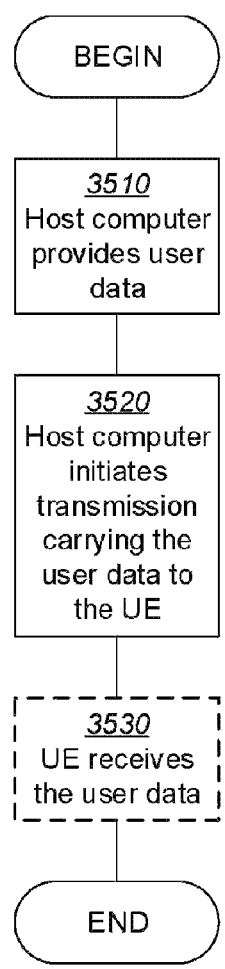

[Figure 21]
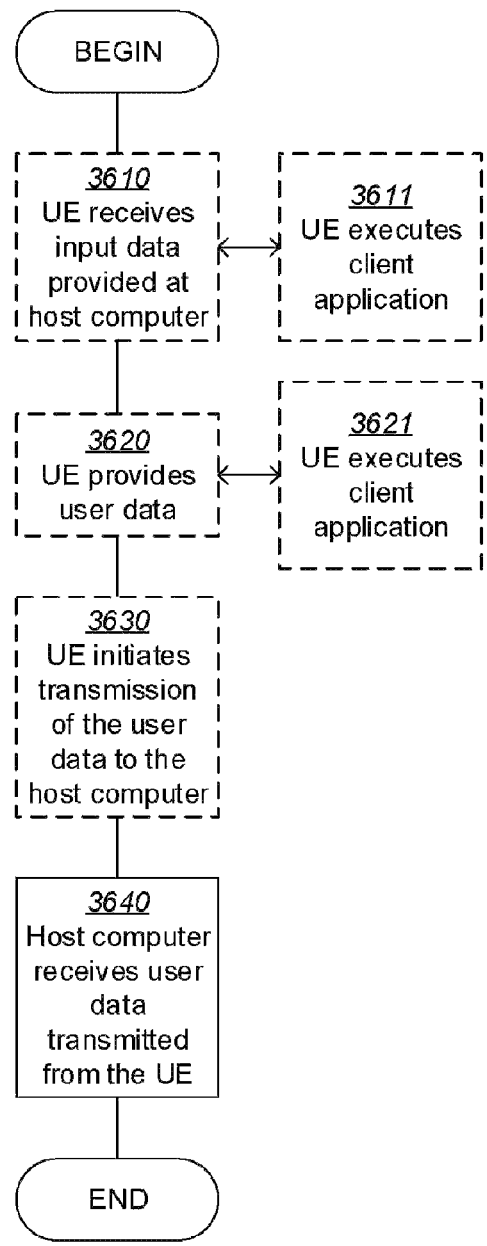

[Figure 22]
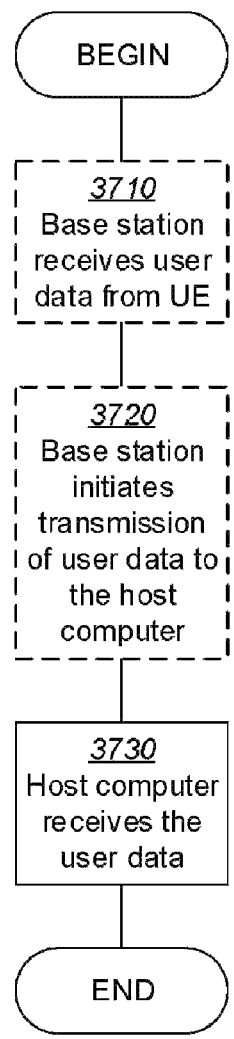

METHOD AND ACCESS NETWORK NODE FOR SCHEDULING TRANSMISSION FOR TERMINAL DEVICE

CROSS REFERENCE TO RELATED APPLICATION

This application is a 35 U.S.C. § 371 national stage application of PCT International Application No. PCT/KR2019/014998 filed on Nov. 6, 2019, the disclosure and content of which is incorporated by reference herein in its entirety.

TECHNICAL FIELD

Embodiments of the disclosure generally relate to wireless communication, and, more particularly, to a method and an access network node for scheduling transmission for terminal device.

BACKGROUND ART

This section introduces aspects that may facilitate better understanding of the present disclosure. Accordingly, the statements of this section are to be read in this light and are not to be understood as admissions about what is in the prior art or what is not in the prior art.

Bandwidth-reduced low-complexity or coverage enhanced (BL/CE) is introduced in release 13 of the 3rd generation partnership project (3GPP). It is a design/implementation that is to meet the 3GPP machine type communication (MTC) criteria as shown in FIG. 1. BL/CE can transmit physical broadcast channel (PBCH), physical random access channel (PRACH), MTC physical downlink control channel (MPDCCH), physical downlink shared channel (PDSCH), physical uplink control channel (PUCCH), physical uplink shared channel (PUSCH) in repeating fashion to make these channels decodable even when the signal quality/power is very poor as in the harsh condition. This kind of repeating transmission would achieve the effect of increasing cell radius and signal penetration.

BL/CE can operate in two different modes as shown in Table 1 below.

TABLE 1

Operation modes of BL/CE

| CE Mode A | CE Mode B |
|---|---|
| No repetition or small number of repetitions | Large number of repetitions Has coverage up to 15 dB coverage enhancement with reference to that of UE Category 1 |
| Equivalent coverage as that of user equipment (UE) Category 1 | |

The operation mode can be configured by rrcConnectionSetup/rrcConnectionReconfiguration message as shown below.

DISCLOSURE OF INVENTION

Technical Problem

One of the objects of the disclosure is to provide an improved solution for scheduling transmission for terminal device.

Technical Solution

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to a first aspect of the disclosure, there is provided a method performed by an access network node. The method may comprise determining, for a transmission to be scheduled for a terminal device, whether one or more control channels required by the transmission have no collision with measurement gap and a traffic channel required by the transmission has collision with a measurement gap, based on current repetition number of the traffic channel. The method may further comprise, when determining that the one or more control channels have no collision with measurement gap and the traffic channel has collision with a measurement gap, determining a second repetition number of the traffic channel that is larger than the current repetition number of the traffic channel. The method may further comprise scheduling the transmission for the terminal device based on the second repetition number.

In this way, there is no delay due to measurement gap since collision between the traffic channel and measurement gap is accepted. Meanwhile, resource waste due to retransmission can be reduced since a larger repetition number of the traffic channel is used.

In an embodiment of the disclosure, the second repetition number minus a number of subframes in which there is collision between the traffic channel and measurement gap may be larger than or equal to the current repetition number.

In an embodiment of the disclosure, the transmission may be a downlink transmission.

In an embodiment of the disclosure, the one or more control channels may comprise a machine type communication (MTC) physical downlink control channel (MPDCCH) and a physical uplink control channel (PUCCH).

In an embodiment of the disclosure, the second repetition number may be determined such that when the second repetition number is used, the PUCCH has no collision with measurement gap.

In an embodiment of the disclosure, the traffic channel may be a physical downlink shared channel (PDSCH).

In an embodiment of the disclosure, the transmission may be an uplink transmission.

```
csi-RS-Config-v1310           CSI-RS-Config-v1310      OPTIONAL,         -- Need ON
ce-Mode-r13                   CHOICE {
   release                                             NULL,
   setup                                               ENUMERATED {ce-ModeA, ce-ModeB}
}
                                                       OPTIONAL,         -- Need ON
csi-RS-ConfigNZPToAdd ModListExt-r13   CSI-RS--ConfigNZPToAddModListExt-r13   OPTIONAL,
   -- Need ON
```

In an embodiment of the disclosure, the one or more control channels may comprise an MPDCCH.

In an embodiment of the disclosure, the traffic channel may be a physical uplink shared channel (PUSCH).

In an embodiment of the disclosure, determining whether the one or more control channels have no collision with measurement gap and the traffic channel has collision with a measurement gap may comprise determining whether a total time period required by the transmission overlaps with a measurement gap. Determining whether the one or more control channels have no collision with measurement gap and the traffic channel has collision with a measurement gap may further comprise, when determining that the total time period overlaps with a measurement gap, determining whether the one or more control channels have no collision with the measurement gap.

In an embodiment of the disclosure, the current repetition number may be based on current radio channel state of the terminal device.

In an embodiment of the disclosure, scheduling the transmission for the terminal device based on the second repetition number may comprise informing the terminal device of the second repetition number.

In an embodiment of the disclosure, the method may further comprise, when the current repetition number is a maximum value configurable to the terminal device and a latency time for the transmission is larger than or equal to a predetermined threshold, scheduling the transmission for the terminal device based on the current repetition number.

In an embodiment of the disclosure, the terminal device may be a bandwidth-reduced low-complexity or coverage enhanced (BL/CE) device.

According to a second aspect of the disclosure, there is provided an access network node. The access network node may comprise at least one processor and at least one memory. The at least one memory may contain instructions executable by the at least one processor, whereby the access network node may be operative to determine, for a transmission to be scheduled for a terminal device, whether one or more control channels required by the transmission have no collision with measurement gap and a traffic channel required by the transmission has collision with a measurement gap, based on current repetition number of the traffic channel. The access network node may be further operative to, when determining that the one or more control channels have no collision with measurement gap and the traffic channel has collision with a measurement gap, determine a second repetition number of the traffic channel that is larger than the current repetition number of the traffic channel. The access network node may be further operative to schedule the transmission for the terminal device based on the second repetition number.

In an embodiment of the disclosure, the second repetition number minus a number of subframes in which there is collision between the traffic channel and measurement gap may be larger than or equal to the current repetition number.

In an embodiment of the disclosure, the transmission may be a downlink transmission.

In an embodiment of the disclosure, the one or more control channels may comprise an MPDCCH and a PUCCH.

In an embodiment of the disclosure, the instructions may be executable by the at least one processor, whereby the access network node may be operative to determine the second repetition number such that when the second repetition number is used, the PUCCH has no collision with measurement gap.

In an embodiment of the disclosure, the traffic channel may be a PDSCH.

In an embodiment of the disclosure, the transmission may be an uplink transmission.

In an embodiment of the disclosure, the one or more control channels may comprise an MPDCCH.

In an embodiment of the disclosure, the traffic channel may be a PUSCH.

In an embodiment of the disclosure, the instructions may be executable by the at least one processor, whereby the access network node may be operative to determine whether the one or more control channels have no collision with measurement gap and the traffic channel has collision with a measurement gap by determining whether a total time period required by the transmission overlaps with a measurement gap. The access network node may be operative to determine whether the one or more control channels have no collision with measurement gap and the traffic channel has collision with a measurement gap by, when determining that the total time period overlaps with a measurement gap, determining whether the one or more control channels have no collision with the measurement gap.

In an embodiment of the disclosure, the current repetition number may be based on current radio channel state of the terminal device.

In an embodiment of the disclosure, the instructions may be executable by the at least one processor, whereby the access network node may be operative to schedule the transmission for the terminal device based on the second repetition number by informing the terminal device of the second repetition number.

In an embodiment of the disclosure, the instructions may be executable by the at least one processor, whereby the access network node may be further operative to, when the current repetition number is a maximum value configurable to the terminal device and a latency time for the transmission is larger than or equal to a predetermined threshold, schedule the transmission for the terminal device based on the current repetition number.

In an embodiment of the disclosure, the terminal device may be a BL/CE device. According to a third aspect of the disclosure, there is provided a computer program product. The computer program product may comprise instructions which when executed by at least one processor, cause the at least one processor to perform the method according to the above first aspect.

According to a fourth aspect of the disclosure, there is provided a computer readable storage medium. The computer readable storage medium may comprise instructions which when executed by at least one processor, cause the at least one processor to perform the method according to the above first aspect.

According to a fifth aspect of the disclosure, there is provided an access network node. The access network node may comprise a first determination module for determining, for a transmission to be scheduled for a terminal device, whether one or more control channels required by the transmission have no collision with measurement gap and a traffic channel required by the transmission has collision with a measurement gap, based on current repetition number of the traffic channel. The access network node may further comprise a second determination module for, when determining that the one or more control channels have no collision with measurement gap and the traffic channel has collision with a measurement gap, determining a second repetition number of the traffic channel that is larger than the current repetition number of the traffic channel. The access network node may further comprise a scheduling module for scheduling the transmission for the terminal device based on the second repetition number.

Advantageous Effects

The present disclosure proposes an improved solution for scheduling transmission for terminal device. The solution may be applied to a communication system including a terminal device and an access network node. For example, the access network node may be a base station such as an eNB in long term evolution (LTE) or a next generation node base station (gNB) in new radio (NR). The terminal device can communicate through a radio access communication link with the base station. The base station can provide radio access communication links to terminal devices that are within its communication service cell. Note that the communications may be performed between the terminal device and the base station according to any suitable communication standards and protocols.

BRIEF DESCRIPTION OF DRAWINGS

These and other objects, features and advantages of the disclosure will become apparent from the following detailed description of illustrative embodiments thereof, which are to be read in connection with the accompanying drawings.

FIG. 1 is a diagram illustrating MTC criteria of the 3GPP;

FIG. 2 is a diagram illustrating a configuration of measurement gap;

FIG. 3 is a diagram illustrating a total time period required by a downlink transmission without repetition;

FIG. 4 is a diagram illustrating a total time period required by an uplink transmission without repetition;

FIG. 5 is a diagram illustrating a total time period required by a downlink transmission with repetitions;

FIG. 6 is a diagram illustrating a total time period required by an uplink transmission with repetitions;

FIG. 9 is a flowchart illustrating a method implemented at an access network node according to an embodiment of the disclosure;

FIG. 10 is a flowchart for explaining the method of FIG. 9;

FIG. 11 is a flowchart illustrating an exemplary process according to an embodiment of the disclosure;

FIG. 12 is a flowchart illustrating an exemplary process according to an embodiment of the disclosure;

FIGS. 13A-13B illustrate an example for explaining the method of FIG. 9;

FIGS. 14A-14B illustrate an example for explaining the method of FIG. 9;

FIG. 15 is a block diagram showing an apparatus suitable for use in practicing some embodiments of the disclosure;

FIG. 16 is a block diagram showing an access network node according to an embodiment of the disclosure;

FIG. 17 is a diagram showing a telecommunication network connected via an intermediate network to a host computer in accordance with some embodiments;

FIG. 18 is a diagram showing a host computer communicating via a base station with a user equipment in accordance with some embodiments;

FIG. 19 is a flowchart illustrating a method implemented in a communication system in accordance with some embodiments;

FIG. 20 is a flowchart illustrating a method implemented in a communication system in accordance with some embodiments;

FIG. 21 is a flowchart illustrating a method implemented in a communication system in accordance with some embodiments; and FIG. 22 is a flowchart illustrating a method implemented in a communication system in accordance with some embodiments.

MODE FOR INVENTION

Figure 7A:
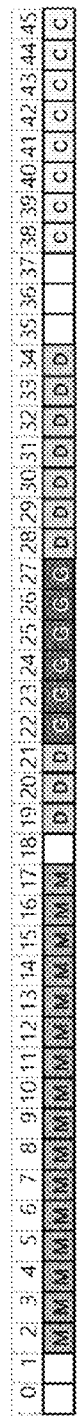
FIG. 7 is a diagram illustrating collision between PDSCH and measurement gap during downlink transmission.

For the purpose of explanation, details are set forth in the following description in order to provide a thorough understanding of the embodiments disclosed. It is apparent, however, to those skilled in the art that the embodiments may be implemented without these specific details or with an equivalent arrangement.

The maximum number of repetitions of PDSCH and PUSCH can be notified by system information block type 2 (SIB2) and the number of repetitions can be determined as a value less than or equal to the maximum number according to a BL/CE UE's channel status. If the BL/CE UE's channel status is bad and coverage enhancement is needed, the maximum number or a number close to the maximum number of repetitions can be used. On the contrary, if the BL/CE UE's channel status is good, a small number of repetitions or no repetition of the transmission can be done. Downlink control information (DCI) carried by MPDCCH has 'repetition number' indicating repetition level of PDSCH for downlink and PUSCH for uplink, as shown below.

```
-- ASN1START
PDSCH-ConfigCommon ::=           SEQUENCE {
    referenceSignalPower              INTEGER (-60..50),
    p-b                               INTEGER (0..3)
}
PDSCH-ConfigCommon-v1310 ::=     SEQUENCE {
    pdsch-maxNumRepetitionCEmodeA-r13    ENUMERATED {
                                             r16, r32 }         OPTIONAL,  -- Need OR
    pdsch-maxNumRepetitionCEmodeB-r13    ENUMERATED {
                                             r192, r256, r384, r512, r768, r1024,
                                             r1536, r2048}       OPTIONAL   -- Need OR
}
```

-continued

```
PDSCH-ConfigDedicated::=    SEQUENCE {
  p-a                       ENUMERATED {
                              dB-6 , dB-4dot77 , dB-3, dB-1dot77,
                              dB0, dB1, dB2, dB3}
}
...
PUSCH-ConfigCommon-v1310 ::=    SEQUENCE {
  pusch-maxNumRepetition CEmodeA-r13    ENUMERATED {
                              r8, r16, r32 }          OPTIONAL, -- Need OR
  pusch-maxNumRepetition CEmodeB-r13    ENUMERATED {
                              r192, r256, r384, r512, r768, r1024,
                              r1536, r2048}           OPTIONAL, -- Need OR
  pusch-HoppingOffset-v1310
    INTEGER (1..maxAvailNarrowBands-r13)              OPTIONAL  -- Need OR
}
PUSCH-ConfigDedicated ::=   SEQUENCE {
  betaOffset-ACK-Index        INTEGER (0..15),
  betaOffset-RI-Index         INTEGER (0..15),
  betaOffset-CQI-Index        INTEGER (0..15)
}
```

As shown in Table 2 and Table 3 below (Table 8-2b and Table 8-2c of 3GPP technical specification (TS) 36.213 V13.14.0), PUSCH repetition levels can be configured according to the maximum number of repetitions configured by SIB2 and are for DCI format 6-0A and DCI format 6-0B.

TABLE 2

PUSCH repetition levels (DCI Format 6-0A)

| Higher layer parameter 'pusch-maxNumRepetitionCEmodeA' | {n1, n2, n3, n4} |
|---|---|
| Not configured | {1, 2, 4, 8} |
| 16 | {1, 4, 8, 16} |
| 32 | {1, 4, 16, 32} |

TABLE 3

PUSCH repetition levels (DCI Format 6-0B)

| Higher layer parameter 'pusch-maxNumRepetitionCEmodeB' | {n1, n2, . . . , n8} |
|---|---|
| Not configured | {4, 8, 16, 32, 64, 128, 256, 512} |
| 192 | {1, 4, 8, 16, 32, 64, 128, 192} |
| 256 | {4, 8, 16, 32, 64, 128, 192, 256} |
| 384 | {4, 16, 32, 64, 128, 192, 256, 384} |
| 512 | {4, 16, 64, 128, 192, 256, 384, 512} |
| 768 | {8, 32, 128, 192, 256, 384, 512, 768} |
| 1024 | {4, 8, 16, 64, 128, 256, 512, 1024} |
| 1536 | {4, 16, 64, 256, 512, 768, 1024, 1536} |
| 2048 | {4, 16, 64, 128, 256, 512, 1024, 2048} |

As shown in Table 4, Table 5 and Table 6 (Table 7.1.11-1, Table 7.1.11-2 and Table 7.1.11-3 of 3GPP TS 36.213 V13.14.0), PDSCH repetition levels can be configured according to the maximum number of repetitions configured by SIB2 and are for DCI format 6-1A, 6-1B and 6-2.

TABLE 4

PDSCH repetition levels (DCI Format 6-1A)

| Higher layer parameter 'pdsch-maxNumRepetitionCEmodeA' | {n1, n2, n3, n4} |
|---|---|
| Not configured | {1, 2, 4, 8} |
| 16 | {1, 4, 8, 16} |
| 32 | {1, 4, 16, 32} |

TABLE 5

PDSCH repetition levels (DCI Format 6-1B)

| Higher layer parameter 'pdsch-maxNumRepetitionCEmodeB' | {n1, n2, . . . , n8} |
|---|---|
| Not configured | {4, 8, 16, 32, 64, 128, 256, 512} |
| 192 | {1, 4, 8, 16, 32, 64, 128, 192} |
| 256 | {4, 8, 16, 32, 64, 128, 192, 256} |
| 384 | {4, 16, 32, 64, 128, 192, 256, 384} |
| 512 | {4, 16, 64, 128, 192, 256, 384, 512} |
| 768 | {8, 32, 128, 192, 256, 384, 512, 768} |
| 1024 | {4, 8, 16, 64, 128, 256, 512, 1024} |
| 1536 | {4, 16, 64, 256, 512, 768, 1024, 1536} |
| 2048 | {4, 16, 64, 128, 256, 512, 1024, 2048} |

TABLE 6

PDSCH repetition levels (DCI Format 6-2)

| 2-bit "DCI subframe repetition number" field in DCI Format 6-2 | {n1, n2, . . . , n8} |
|---|---|
| 00 | {1, 2, 4, 8, 16, 32, 64, 128} |
| 01 | {4, 8, 16, 32, 64, 128, 192, 256} |
| 10 | {32, 64, 128, 192, 256, 384, 512, 768} |
| 11 | {192, 256, 384, 512, 768, 1024, 1536, 2048} |

Before handover, a UE normally measures the cell power of neighbor cells and reports it to the network (e.g. an evolved node base station (eNodeB or eNB)), so that the network can make decision about whether to allow the UE to handover to the neighbor cell or not. In case of inter-frequency measurement, the frequency of the neighbor cell to measure the signal quality is different with the current cell. So measurement gap is provided, during which the UE does not transmit/receive signal and can switch to the neighbor cell, perform the measurement and come back to the current cell.

Between the UE and the eNodeB, measurement gap configuration including starting position, period and length of the gap can be established by MeasGapConfig information element (IE) of radio resource control (RRC) Connection Reconfiguration message. For example, the measurement gap repetition period (MGRP) may be 40 ms or 80 ms and the measurement gap length may be 6 ms or 3 ms. More details about the gap pattern configurations can be obtained from Table 8.1.2.1-1 of 3GPP TS 36.133 V14.13.0.

If measurement gap is configured, a UE cannot transmit and receive not only data but also downlink (DL) assignment, uplink (UL) scheduling grant and hybrid automatic repeat request (HARQ) acknowledgement/non-acknowledgement (ACK/NACK) transmission during measurement gap. So, measurement gap needs to be considered for a transmission to be scheduled. In addition, repeating channels such as MPDCCH, PDSCH, PUSCH and PUCCH to enhance coverage makes transmission time longer for BL/CE and it needs to be considered as well.

When an eNodeB schedules a downlink transmission or uplink transmission, it should check whether there is collision between the transmission and measurement gap before starting the transmission. The problem is that it is not possible to transmit data without collision in case that the number of repetitions of a channel is high due to the UE's position or the channel condition.

For example, if measurement gap is configured and MGRP is 40 ms, available subframes for transmission between measurement gaps are 34 ms as shown in FIG. 2. Without repetition, the total time period required is 7 ms for downlink and 5 ms for uplink, as shown in FIG. 3 and FIG. 4. It is enough to transmit within 34 ms without collision with measurement gap.

With repetitions, on the other hand, it is possible not to transmit data within 34 ms. If the number of repetitions for MPDCCH, PDSCH and PUSCH are 16, 16 and 8 as shown in FIGS. 5 and 6, the total transmission time is 44 ms for downlink and is 35 ms for uplink, which is longer than 34 ms. This means there is always collision with measurement gap during transmission until the measurement gap configuration is released. If we want to transmit data without collision, the only way is to wait until the measurement is over, which results in huge delay from the viewpoint of packet scheduler.

Figure 8:
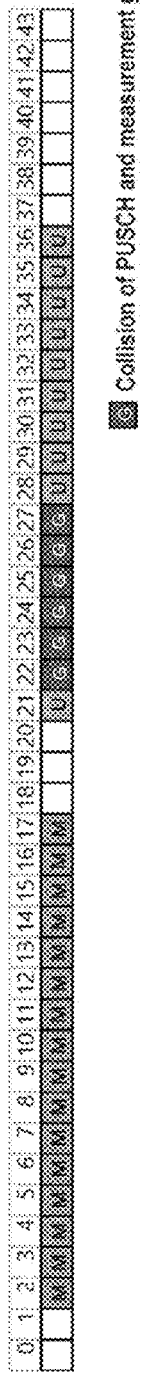
FIG. 8 is a diagram illustrating collision between PUSCH and measurement gap during uplink transmission.

Another simple solution is transmitting data and allowing the collision between only PDSCH/PUSCH and measurement gap. FIG. 7 and FIG. 8 illustrate the downlink transmission and the uplink transmission that allow collision with measurement gap, respectively. As shown, this simple solution does not cause delay. However, there is some loss of PDSCH and PUSCH because they are not transmitted and received during the measurement gap of 6 ms. Assuming the repetition level completely matches the UE's channel condition, PDSCH/PUSCH may not be decoded by the UE or the eNodeB due to the loss and it may have to be recovered by retransmission. This is not a good solution since it takes more time and wastes physical resources due to retransmission. There is also an impact on link adaptation even though the cause of decoding failure is not bad radio link.

The present disclosure proposes an improved solution for scheduling transmission for terminal device. The solution may be applied to a communication system including a terminal device and an access network node. For example, the access network node may be a base station such as an eNB in long term evolution (LTE) or a next generation node base station (gNB) in new radio (NR). The terminal device can communicate through a radio access communication link with the base station. The base station can provide radio access communication links to terminal devices that are within its communication service cell. Note that the communications may be performed between the terminal device and the base station according to any suitable communication standards and protocols.

The terminal device may also be referred to as, for example, device, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Hereinafter, the solution will be described in detail with reference to FIGS. 9-22. FIG. 9 is a flowchart illustrating a method implemented at an access network node according to an embodiment of the disclosure. For example, the flowchart may be started every subframe or MPDCCH candidate when the access network node wants to check whether the start of a transmission is possible or not. At block 902, the access network node determines, for a transmission to be scheduled for a terminal device, whether one or more control channels required by the transmission have no collision with measurement gap and a traffic channel required by the transmission has collision with a measurement gap, based on current repetition number of the traffic channel. For example, the terminal device may be a BL/CE device. The current repetition number of the traffic channel may be based on the current radio channel state (or condition) of the terminal device. As a first option, the transmission may be a downlink transmission. In this case, the one or more control channels may comprise an MPDCCH and a PUCCH and the traffic channel may be a PDSCH. As a second option, the transmission may be an uplink transmission. In this case, the one or more control channels may comprise an MPDCCH and the traffic channel may be a PUSCH.

For example, block 902 may be implemented as blocks 1001-1002 of FIG. 10. At block 1001, the access network node determines whether a total time period required by the transmission overlaps with a measurement gap. As shown in FIG. 5, for the downlink transmission, the total time period may be a combination of a first time period for MPDCCH transmission, a second time period for PDSCH transmission, a third time period for PUCCH transmission, a first guard period of 1 ms, and a second guard period of 3 ms. As described above, the current repetition number of the traffic channel, PDSCH, may be based on the current radio channel state of the terminal device. Similarly, the current repetition number of the control channels, MPDCCH and PUCCH, may also be based on the current radio channel state of the terminal device.

As shown in FIG. 6, for the uplink transmission, the total time period may be a combination of a first time period for MPDCCH transmission, a second time period for PUSCH transmission, and a guard period of 3 ms. The current repetition number of the channels, MPDCCH and PUSCH, may be based on the current radio channel state of the terminal device. Note that FIGS. 5 and 6 are simplified diagrams for illustration purpose. It is possible that the valid subframes available for transmission are not contiguous. In this case, the set of valid subframes may be determined according to SIB2. For example, fdd-DownlinkOrTddSubframeBitmapBR and fdd-UplinkSubframeBitmapBR in SBI2 indicate the set of valid subframes for frequency division duplexing (FDD) downlink/time division duplexing (TDD) and FDD uplink respectively. Also note that the above configuration of the guard periods shown in FIGS. 3-6 is merely an exemplary example for illustration purpose. Such configuration may vary depending on the specific application scenario (e.g. the employed communication standard and protocol).

When determining that the total time period overlaps with a measurement gap, the access network node determines whether the one or more control channels have no collision with the measurement gap at block 1002. If the one or more control channels (e.g., MPDCCH and PUCCH for downlink, or MPDCCH for uplink) have no collision with the measurement gap, blocks 904-906 may be performed. On the other hand, if the one or more control channels have collision with the measurement gap, the scheduling for the transmission may be deferred. Note that if the total time period required by the transmission has no collision with measurement gap, the transmission may be scheduled as normal.

Referring back to FIG. 9, when determining that the one or more control channels have no collision with measurement gap and the traffic channel has collision with a measurement gap, the access network node determines a second repetition number of the traffic channel that is larger than the current repetition number of the traffic channel, at block 904. Since a larger repetition number of the traffic channel is determined for scheduling the transmission, resource waste due to retransmission can be reduced. Meanwhile, since collision between the traffic channel and measurement gap is accepted, there is no delay due to measurement gap.

As an example, the second repetition number may be determined such that the second repetition number minus a number of subframes in which there is collision between the traffic channel and measurement gap is larger than or equal to the current repetition number. In this way, there is no degradation due to wrong channel estimation by link adaptation. In contrast, simply allowing the collision as mentioned above would cause transmission failure due to the collision. In turn, the transmission failure impacts on link adaptation even though the cause of transmission failure is not bad radio channel.

Note that when the second repetition number is used, the one or more control channels still should have no collision with measurement gap. For example, for the downlink transmission, when the second repetition number is used, the PUCCH should still have no collision with measurement gap. There is no need to check the MPDCCH again since the second repetition number has no influence on the position of the MPDCCH along the time axis.

At block 906, the access network node schedules the transmission for the terminal device based on the second repetition number. For example, the second repetition number may be informed to the terminal device via DCI carried by MPDCCH. A downlink assignment for the downlink transmission or an uplink grant for the uplink transmission may also be sent to the terminal device via MPDCCH.

FIG. 11 is a flowchart illustrating an exemplary process according to an embodiment of the disclosure. For example, the process may be performed by an eNodeB for increasing the number of repetitions of PDSCH. The process may start when PDSCH transmission collides with measurement gap and there is no collision between measurement gap and MPDCCH/PUCCH for a downlink transmission. At block 1108, the process determines a candidate PDSCH repetition number as the current PDSCH repetition number. The current PDSCH repetition number may be a proper value for transmitting the PDSCH so as to be received by the UE with a decodable level.

At block 1110, the process determines whether the candidate PDSCH repetition number is a maximum value configurable to the UE. For example, the maximum repetition number may be configured in higher layer parameter 'pdsch-maxNumRepetitionCEmodeA' or 'pdsch-maxNumRepetitionCEmodeB'. If the candidate PDSCH repetition number is the maximum value, the process determines whether a latency time for the downlink transmission is larger than or equal to a predetermined threshold at block 1120. If the latency time is larger than or equal to the predetermined threshold, the process schedules the transmission based on the current PDSCH repetition number at block 1122. If the latency time is smaller than the predetermined threshold, the process defers the transmission at block 1124.

On the other hand, if the candidate PDSCH repetition number is not the maximum value, the process increases the candidate PDSCH repetition number to a next value at block 1112. For example, as shown in Table 4, if the higher layer parameter 'pdsch-maxNumRepetitionCEmodeA' is 16 and the candidate PDSCH repetition number is assumed to be 4, the order for increasing the candidate PDSCH repetition number is 4→8→16. At block 1114, the process determines whether the candidate PDSCH repetition number minus a number of subframes in which there is collision between PDSCH and measurement gap is larger than or equal to the current PDSCH repetition number. For example, the process may calculate the number of PDSCH subframes that do not collide with measurement gap if the candidate PDSCH repetition number is used for transmission, and compare this number with the current PDSCH repetition number.

If the determination result at block 1114 is negative (e.g. the number of PDSCH subframes without collision is smaller than the current PDSCH repetition number), the process proceeds to block 1110. If the determination result at block 1114 is positive (e.g. the number of PDSCH subframes without collision is larger than or equal to the current PDSCH repetition number), the process determines whether PUCCH collides with measurement gap or not in a case that the candidate PDSCH repetition number is used for transmission at block 1116. If PUCCH collides with measurement gap, the process proceeds to block 1110. If PUCCH does not collide with measurement gap, the process schedules the downlink transmission based on the candidate PDSCH repetition number at block 1118.

FIG. 12 is a flowchart illustrating an exemplary process according to an embodiment of the disclosure. For example, the process may be performed by an eNodeB for increasing the number of repetitions of PUSCH. The process may start when PUSCH transmission collides with measurement gap and there is no collision between measurement gap and MPDCCH for an uplink transmission. At block 1208, the process determines a candidate PUSCH repetition number as the current PUSCH repetition number. The current PUSCH repetition number may be a proper value for transmitting the PUSCH so as to be received by the eNodeB with a decodable level.

At block 1210, the process determines whether the candidate PUSCH repetition number is a maximum value configurable to the UE. For example, the maximum repetition number may be configured in higher layer parameter 'pusch-maxNumRepetitionCEmodeA' or 'pusch-maxNum-RepetitionCEmodeB'. If the candidate PUSCH repetition number is the maximum value, the process determines whether a latency time for the uplink transmission is larger than or equal to a predetermined threshold at block 1220. If the latency time is larger than or equal to the predetermined threshold, the process schedules the uplink transmission based on the current PUSCH repetition number at block 1222. If the latency time is smaller than the predetermined threshold, the process defers the transmission at block 1224.

On the other hand, if the candidate PUSCH repetition number is not the maximum value, the process increases the candidate PUSCH repetition number to a next value at block 1212. Then, at block 1214, the process determines whether the candidate PUSCH repetition number minus a number of subframes in which there is collision between PUSCH and measurement gap is larger than or equal to the current PUSCH repetition number at block 1214. For example, the process may calculate the number of PUSCH subframes that do not collide with measurement gap if the candidate PUSCH repetition number is used for transmission, and compare this number with the current PUSCH repetition number.

If the determination result at block 1214 is negative (e.g. the number of PUSCH subframes without collision is smaller than the current PUSCH repetition number), the process proceeds to block 1210. If the determination result at block 1214 is positive (e.g. the number of PUSCH subframes without collision is larger than or equal to the current PUSCH repetition number), the process schedules the uplink transmission based on the candidate PUSCH repetition number at block 1218.

FIGS. 13A-13B illustrate an example for explaining the method of FIG. 9. As shown in FIG. 13A, the access network node determines that measurement gap is located during PDSCH transmission and MPDCCH/PUCCH transmission has no collision with measurement gap, based on the current repetition number of PDSCH. In response to this situation, the access network node can decide to start the downlink transmission after increasing the current repetition number of PDSCH to a second repetition number, as shown in FIG. 13B. Because the number of subframes of PDSCH without collision with measurement gap when the second repetition number is used is larger than the current repetition number, PDSCH is decodable and there would be no impact on link adaptation.

FIGS. 14A-14B illustrate an example for explaining the method of FIG. 9. As shown in FIG. 14A, the access network node determines that measurement gap is located during PUSCH transmission and MPDCCH transmission has no collision with measurement gap, based on the current repetition number of PUSCH. In response to this situation, the access network node can decide to start the uplink transmission after increasing the current repetition number of PUSCH to a second repetition number, as shown in FIG. 14B. Because the number of subframes of PUSCH without collision with measurement gap when the second repetition number is used is larger than the current repetition number, PUSCH is decodable and there would be no impact on link adaptation.

FIG. 15 is a block diagram showing an apparatus suitable for use in practicing some embodiments of the disclosure. For example, the access network node described above may be implemented through the apparatus 1500. As shown, the apparatus 1500 may include a processor 1510, a memory 1520 that stores a program, and optionally a communication interface 1530 for communicating data with other external devices through wired and/or wireless communication.

The program includes program instructions that, when executed by the processor 1510, enable the apparatus 1500 to operate in accordance with the embodiments of the present disclosure, as discussed above. That is, the embodiments of the present disclosure may be implemented at least in part by computer software executable by the processor 1510, or by hardware, or by a combination of software and hardware.

The memory 1520 may be of any type suitable to the local technical environment and may be implemented using any suitable data storage technology, such as semiconductor based memory devices, flash memories, magnetic memory devices and systems, optical memory devices and systems, fixed memories and removable memories. The processor 1510 may be of any type suitable to the local technical environment, and may include one or more of general purpose computers, special purpose computers, microprocessors, digital signal processors (DSPs) and processors based on multi-core processor architectures, as non-limiting examples.

FIG. 16 is a block diagram showing an access network node according to an embodiment of the disclosure. As shown, the access network node 1600 comprises a first determination module 1602, a second determination module 1604 and a scheduling module 1606. The first determination module 1602 may be configured to determine, for a transmission to be scheduled for a terminal device, whether one or more control channels required by the transmission have no collision with measurement gap and a traffic channel required by the transmission has collision with a measurement gap, based on current repetition number of the traffic channel, as described above with respect to block 902. The second determination module 1604 may be configured to, when determining that the one or more control channels have no collision with measurement gap and the traffic channel has collision with a measurement gap, determine a second repetition number of the traffic channel that is larger than the current repetition number of the traffic channel, as described above with respect to block 904. The scheduling module 1606 may be configured to schedule the transmission for the terminal device based on the second repetition number, as described above with respect to block 906. The modules described above may be implemented by hardware, or software, or a combination of both.

With reference to FIG. 17, in accordance with an embodiment, a communication system includes telecommunication network 3210, such as a 3GPP-type cellular network, which comprises access network 3211, such as a radio access network, and core network 3214. Access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to core network 3214 over a wired or wireless connection 3215. A first UE 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 17 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 18. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 18) served by base station 3320. Communication interface 3326 may be configured to facilitate connection 3360 to host computer 3310. Connection 3360 may be direct or it may pass through a core network (not shown in FIG. 18) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 18 may be similar or identical to host computer 3230, one of base stations 3212a, 3212b, 3212c and one of UEs 3291, 3292 of FIG. 17, respectively. This is to say, the inner workings of these entities may be as shown in FIG. 18 and independently, the surrounding network topology may be that of FIG. 17.

In FIG. 18, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

According to an aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The base station may determine, for a transmission to be scheduled for a terminal device, whether one or more control channels required by the transmission have no collision with measurement gap and a traffic channel required by the transmission has collision with a measurement gap, based on current repetition number of the traffic channel. When determining that the one or more control channels have no collision with measurement gap and the traffic channel has collision with a measurement gap, the base station may determine a second repetition number of the traffic channel that is larger than the current repetition number of the traffic channel. The base station may schedule the transmission for the terminal device based on the second repetition number.

In an embodiment of the disclosure, the method may further comprise, at the base station, transmitting the user data.

In an embodiment of the disclosure, the user data may be provided at the host computer by executing a host application. The method may further comprise, at the terminal device, executing a client application associated with the host application.

According to another aspect of the disclosure, there is provided a communication system including a host computer comprising processing circuitry configured to provide user data and a communication interface configured to forward the user data to a cellular network for transmission to a terminal device. The cellular network may comprise a base station having a radio interface and processing circuitry. The base station's processing circuitry may be configured to determine, for a transmission to be scheduled for a terminal device, whether one or more control channels required by the transmission have no collision with measurement gap and a traffic channel required by the transmission has collision with a measurement gap, based on current repetition number of the traffic channel. The base station's processing circuitry may be further configured to, when determining that the one or more control channels have no collision with measurement gap and the traffic channel has collision with a measurement gap, determine a second repetition number of the traffic channel that is larger than the current repetition number of the traffic channel. The base station's processing circuitry may be further configured to schedule the transmission for the terminal device based on the second repetition number.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application, thereby providing the user data. The terminal device may comprise processing circuitry configured to execute a client application associated with the host application.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. It should be noted that two blocks shown in succession in the figures may, in fact, be executed substantially concurrently, or the blocks may sometimes be executed in the reverse order, depending upon the functionality involved.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

The invention claimed is:

1. A method performed by an access network node, comprising:
   determining, for a transmission to be scheduled for a terminal device, whether one or more control channels required by the transmission have no collision with a measurement gap and a traffic channel required by the transmission has collision with a measurement gap, based on current repetition number of the traffic channel;

in response to determining that the one or more control channels have no collision with a measurement gap and the traffic channel has collision with a measurement gap, determining a second repetition number of the traffic channel that is larger than the current repetition number of the traffic channel; and scheduling the transmission for the terminal device based on the second repetition number.

2. The method according to claim 1, wherein the second repetition number minus a number of subframes in which there is collision between the traffic channel and the measurement gap is larger than or equal to the current repetition number.

3. The method according to claim 1, wherein the transmission is a downlink transmission.

4. The method according to claim 3, wherein the one or more control channels comprise a machine type communication, MTC, physical downlink control channel, MPDCCH, and a physical uplink control channel, PUCCH.

5. The method according to claim 4, wherein the second repetition number is determined such that when the second repetition number is used, the PUCCH has no collision with the measurement gap.

6. The method according to claim 3, wherein the traffic channel is a physical downlink shared channel, PDSCH.

7. The method according to claim 1, wherein the transmission is an uplink transmission.

8. The method according to claim 7, wherein the one or more control channels comprise an MPDCCH.

9. The method according to claim 7, wherein the traffic channel is a physical uplink shared channel, PUSCH.

10. The method according to claim 1, wherein determining whether the one or more control channels have no collision with a measurement gap and the traffic channel has collision with a measurement gap comprises:

determining whether a total time period required by the transmission overlaps with a measurement gap; and in response to determining that the total time period overlaps with a measurement gap, determining whether the one or more control channels have no collision with the measurement gap.

11. The method according to claim 1, wherein the current repetition number is based on current radio channel state of the terminal device.

12. The method according to claim 1, wherein scheduling the transmission for the terminal device based on the second repetition number comprises:

informing the terminal device of the second repetition number.

13. The method according to claim 1, further comprising:

in response to the current repetition number is a maximum value configurable to the terminal device and a latency time for the transmission is larger than or equal to a predetermined threshold, scheduling the transmission for the terminal device based on the current repetition number.

14. The method according to claim 1, wherein the terminal device is a bandwidth-reduced low-complexity or coverage enhanced, BL/CE, device.

15. An access network node comprising:

at least one processor; and at least one memory, the at least one memory containing instructions executable by the at least one processor, whereby the access network node is operative to:

determine, for a transmission to be scheduled for a terminal device, whether one or more control channels required by the transmission have no collision with a measurement gap and a traffic channel required by the transmission has collision with a measurement gap, based on current repetition number of the traffic channel;

in response to determining that the one or more control channels have no collision with a measurement gap and the traffic channel has collision with a measurement gap, determine a second repetition number of the traffic channel that is larger than the current repetition number of the traffic channel; and schedule the transmission for the terminal device based on the second repetition number.

16. The access network node according to claim 15, wherein the second repetition number minus a number of subframes in which there is collision between the traffic channel and the measurement gap is larger than or equal to the current repetition number.

17. The access network node according to claim 15, wherein the transmission is a downlink transmission.

18. The access network node according to claim 17, wherein the one or more control channels comprise a machine type communication, MTC, physical downlink control channel, MPDCCH, and a physical uplink control channel, PUCCH.

19. The access network node according to claim 18, wherein the instructions are executable by the at least one processor, whereby the access network node is operative to determine the second repetition number such that when the second repetition number is used, the PUCCH has no collision with the measurement gap.

20. The access network node according to claim 17, wherein the traffic channel is a physical downlink shared channel, PDSCH.

* * * * *